Dec. 3, 1957     B. L. BROSIUS     2,814,899
COLLAPSIBLE NET

Filed Dec. 28, 1955     2 Sheets-Sheet 1

INVENTOR.
Bob L. Brosius
BY Robert U. Geil, Jr.
ATTORNEY

Dec. 3, 1957   B. L. BROSIUS   2,814,899
COLLAPSIBLE NET
Filed Dec. 28, 1955   2 Sheets-Sheet 2

INVENTOR.
Bob L. Brosius
BY Robert U. Geib, Jr.
ATTORNEY

2,814,899

COLLAPSIBLE NET

Bob L. Brosius, Shamokin, Pa.

Application December 28, 1955, Serial No. 555,926

2 Claims. (Cl. 43—12)

This invention relates to collapsible nets for catching various objects, and particularly fish and the like, although not limited thereto.

It is among the objects of the present invention to provide a net which is very efficient in catching fish, butterflies, and various other objects, and which may be so collapsed as to occupy but a minimum of space.

Another object is the attainment of the foregoing in a device which is light in weight, and simple and inexpensive to manufacture.

Still another object is to provide all of the advantages set forth hereinabove with a device which is attractive in appearance.

The invention, then, comprises the features hereinafter fully described and as particularly pointed out in the claims, the following description and the annexed drawings setting forth in detail certain illustrative embodiments of the invention, these being indicative of one of possibly several ways in which the principles of the invention may be employed.

Figure 1:
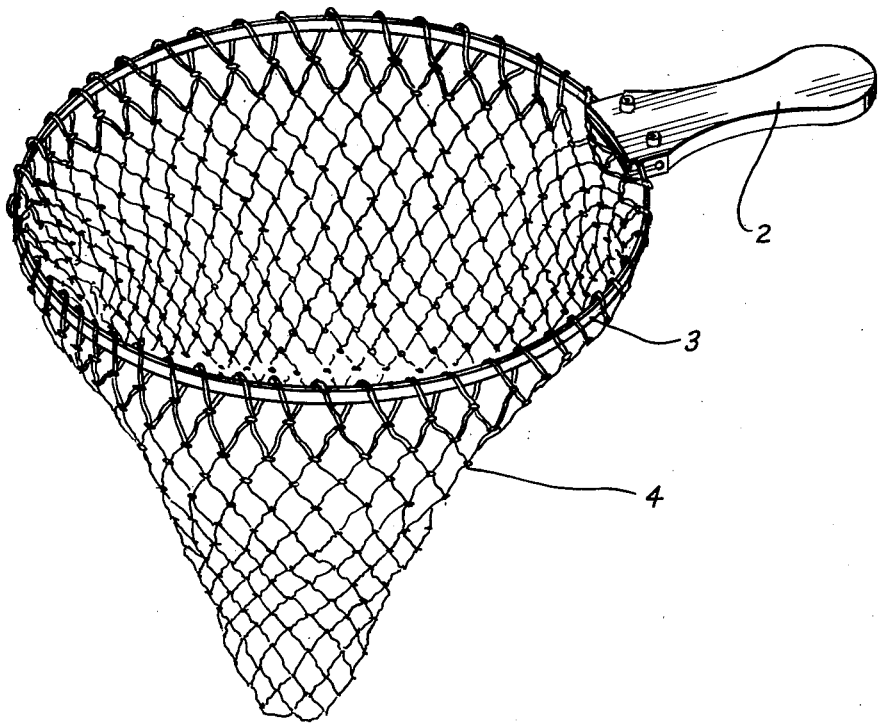
Figure 1 is a perspective of the collapsible net of the present invention in its ready-to-use state, the same comprising a handle, a generally circular rim portion, and a suitable netting.
Figure 2:
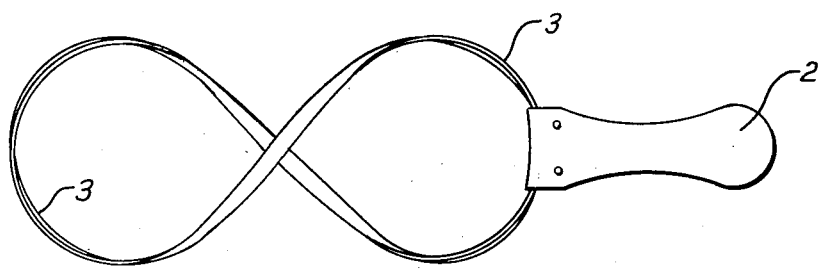
Figure 2 is a plan of the collapsible net of Figure 1, but with the netting removed, and illustrating the rim member as twisted into a figure-8 shape, this representing one of the steps in collapsing the rim of the net.

Referring more particularly to the drawings, the elements of the collapsible net comprise, as aforementioned, a handle member 2, a loop or rim member 3, and a suitable netting 4. The rim member 3 is generally circular in the ready-to-use state and it is linearly uncollapsible in the sense that it is either completely continuous, or with its ends permanently fixed. Also it is composed of a sturdy yet resilient material, such as spring steel. According to the teachings of the present invention, when the resilient substantially circular rim member 3 is grasped in one hand at a position adjacent the point of attachment to the handle 2, and with the other hand at a substantially directly opposition position, and twisted, the rim will form a substantially figure-8 shape, as illustrated in Figure 2, with the crossed-over portions tending to fold over upon themselves when the opposite ends of the figure-8 are moved together.

Figure 3:
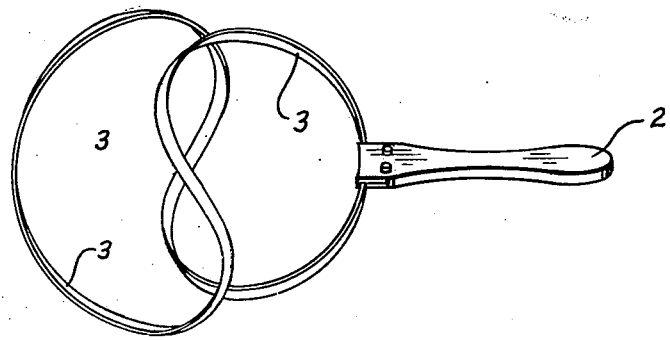
Figure 3 is a perspective of the handle and rim, with the netting removed, and illustrating the rim as having been moved from the figure-8 shape of Figure 2 to assume a foreshortened shape wherein the crossed-over portions of the rim turn over and commence to assume the position of Figure 4, wherein the collapsing rim commences to assume a series of convolutions.

This tendency toward folding over of the crossed-over portions of the mid-section of the figure-8 shape is illustrated in Figure 3.

Figure 4:
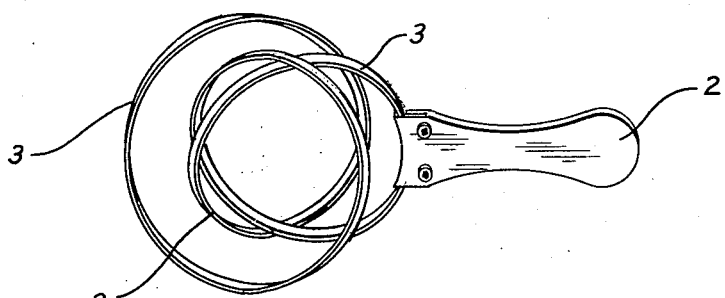

Upon the continuation of this movement, and the moving together of the ends of the figure-8, the rim 3 tends to assume the form of a series of convolutions, as illustrated in Figure 4.

Figure 5:
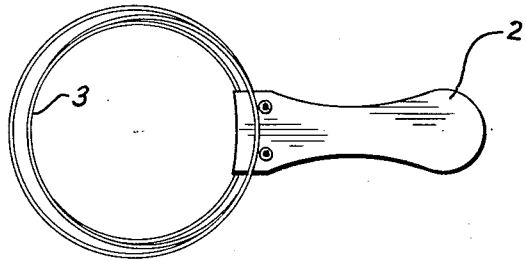
Figure 5 is a plan illustrating the handle with the rim in completely collapsed convoluted position.
Figure 6:
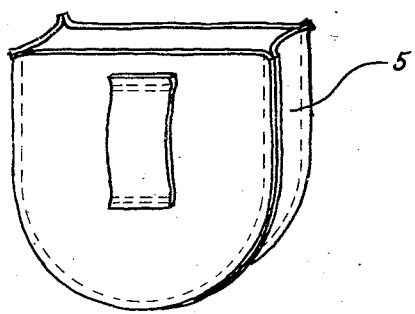
Figure 6 is a perspective of the carrying case into which the collapsed and convoluted rim is adapted to fit, together with the netting.

The complete folding of the rim 3 is illustrated in Figure 5; and when it is in completely folded, or collapsed, position, the rim 3 assumes but a small portion of its original diameter (such as one-third) and can be conveniently fitted into a compact carrying case. A suitable carrying case is illustrated at 5 in Figure 6 of the drawings.

When the rim 3 is in its fully collapsed position practically all of the portions of the net 4 may conveniently be moved into the center of its convolutions, thus further conserving space.

While I have shown and described certain specific embodiments of the present invention, it will be readily understood by those skilled in the art that I do not wish to be limited exactly thereto, since various modifications may be made without departing from the scope of the invention as defined in the appended claims.

I claim:

1. A net for catching various objects, such as wild life, comprising a linearly uncollapsible, substantially circular rim member, said rim member being composed of a flexible material such as will enable it to be twisted into a figure-8 formation, and then, upon further twisting and movement of the ends of the figure-8 toward each other, be made to assume a series of three convolutions, whereby the rim member may be collapsed into approximately one-third of its original diameter, and a net carried by said rim member.

2. A net for catching various objects, such as wild life, comprising a linearly uncollapsible, substantially circular rim member, said rim member being composed of a flexible material such as will enable it to be twisted into a figure-8 formation, and then, upon further twisting and movement of the ends of the figure-8 toward each other, be made to assume a series of three convolutions, whereby the rim member may be collapsed into approximately one-third of its original diameter, a net carried by said rim member, and a handle attached to said rim member.

References Cited in the file of this patent

UNITED STATES PATENTS

| 167,189 | Nason | Aug. 31, 1875 |
| 834,905 | Haskell | Nov. 6, 1906 |
| 956,803 | Fromm | May 3, 1910 |